(12) United States Patent
Ogawa et al.

(10) Patent No.: US 9,635,600 B2
(45) Date of Patent: *Apr. 25, 2017

(54) TERMINAL AND COMMUNICATION METHOD THEREOF

(71) Applicant: Sun Patent Trust, New York, NY (US)

(72) Inventors: Yoshihiko Ogawa, Kanagawa (JP); Seigo Nakao, Kanagawa (JP); Akihiko Nishio, Osaka (JP); Masayuki Hoshino, Kanagawa (JP); Daichi Imamura, Beijing (CN); Atsushi Sumasu, Fukuoka (JP)

(73) Assignee: Sun Patent Trust, New York, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/312,473

(22) Filed: Jun. 23, 2014

(65) Prior Publication Data

US 2014/0307536 A1   Oct. 16, 2014

Related U.S. Application Data

(63) Continuation of application No. 13/575,278, filed as application No. PCT/JP2011/000726 on Feb. 9, 2011, now Pat. No. 8,792,534.

(30) Foreign Application Priority Data

Feb. 10, 2010  (JP) .................................. 2010-027959
Apr. 30, 2010  (JP) .................................. 2010-105326

(51) Int. Cl.
 *H04W 48/02* (2009.01)
 *H04B 7/0413* (2017.01)
 (Continued)

(52) U.S. Cl.
 CPC .......... *H04W 48/02* (2013.01); *H04B 7/0413* (2013.01); *H04L 1/0031* (2013.01);
 (Continued)

(58) Field of Classification Search
 CPC ..... H04W 28/04; H04W 48/02; H04W 48/12; H04L 5/001; H04L 5/0055; H04L 5/0057;
 (Continued)

(56) References Cited

U.S. PATENT DOCUMENTS 7,392,460 B2   6/2008   Kim et al.
7,787,483 B2   8/2010   Vanderhaegen et al.
(Continued)

FOREIGN PATENT DOCUMENTS

CN   101809959 A   8/2010
JP   2009-89187 A   4/2009
(Continued)

OTHER PUBLICATIONS

"3rd Generation Partnership Project: Technical Specification Group Radio Access Network: Evolved Universal Terrestrial Radio Access (E-UTRA); Multiplexing and channel coding (Release 8)," Technical Specification, 3GPP TS 36.212 V8.7.0, May 2009, 60 pages.
(Continued)

*Primary Examiner* — Kan Yuen
*Assistant Examiner* — Richard Chang
(74) *Attorney, Agent, or Firm* — Seed Intellectual Property Law Group LLP

(57) ABSTRACT

A terminal and a communication method thereof whereby, even in a case of employing the asymmetric carrier aggregation system and further employing the MIMO transmission method for upstream channels, the error characteristic of control information can be prevented from being degraded. In the terminal, a transport signal forming unit forms transport signals by arranging, based on an arrange-
(Continued)

ment rule, ACK/NACK and CQI in a plurality of layers. According to the arrangement rule, an error detection result is arranged, on a priority basis, in a layer that is different from a layer in which the channel quality information is arranged. In this way, the puncturing of CQI using ACK/NACK can be minimized, with the result that the error characteristic of control information can be prevented from being degraded.

10 Claims, 13 Drawing Sheets

(51) Int. Cl.
*H04L 1/00* (2006.01)
*H04L 1/16* (2006.01)
*H04L 1/18* (2006.01)
*H04L 5/00* (2006.01)
*H04W 28/04* (2009.01)
*H04W 48/12* (2009.01)

(52) U.S. Cl.
CPC .......... *H04L 1/1671* (2013.01); *H04L 1/1861* (2013.01); *H04L 1/1893* (2013.01); *H04L 5/001* (2013.01); *H04L 5/0055* (2013.01); *H04L 5/0057* (2013.01); *H04W 28/04* (2013.01); *H04W 48/12* (2013.01); *H04L 5/0023* (2013.01)

(58) Field of Classification Search
CPC ... H04L 1/0031; H04L 1/1671; H04L 1/1893; H04L 1/1861; H04L 5/0023; H04B 7/0413
USPC .......................................................... 370/216
See application file for complete search history.

(56) References Cited

U.S. PATENT DOCUMENTS

| | | | |
|---|---|---|---|
| 8,630,184 | B2 | 1/2014 | Kim et al. |
| 2007/0070956 | A1 | 3/2007 | Seki |
| 2008/0049813 | A1 | 2/2008 | Kurose et al. |
| 2008/0095106 | A1 | 4/2008 | Malladi et al. |
| 2008/0165838 | A1 | 7/2008 | Vanderhaegen et al. |
| 2008/0305745 | A1 | 12/2008 | Zhang et al. |
| 2008/0311939 | A1 | 12/2008 | Hugl et al. |
| 2008/0318578 | A1 | 12/2008 | Worrall |
| 2009/0010208 | A1 | 1/2009 | Ishizaki |
| 2009/0022135 | A1 | 1/2009 | Papasakellariou et al. |
| 2009/0042558 | A1 | 2/2009 | Shen et al. |
| 2009/0046805 | A1 | 2/2009 | Kim et al. |
| 2009/0073922 | A1* | 3/2009 | Malladi .................. H04L 1/0004 370/328 |
| 2009/0279460 | A1 | 11/2009 | Sarkar |
| 2010/0110878 | A1 | 5/2010 | Frederiksen et al. |
| 2010/0172373 | A1 | 7/2010 | Kimura et al. |
| 2010/0246512 | A1 | 9/2010 | Kawamura et al. |
| 2011/0188594 | A1* | 8/2011 | Kim ....................... H04L 1/0067 375/260 |

FOREIGN PATENT DOCUMENTS

| | | |
|---|---|---|
| JP | 2010-512033 A | 4/2010 |
| TW | 200915754 A | 4/2009 |
| WO | 2008/014275 A2 | 1/2008 |
| WO | 2008/083958 A1 | 7/2008 |
| WO | 2008/084377 A2 | 7/2008 |
| WO | 2009/028095 A1 | 3/2009 |
| WO | 2011/127098 A1 | 10/2011 |
| WO | 2011/129611 A2 | 10/2011 |
| WO | 2011/129626 A2 | 10/2011 |

OTHER PUBLICATIONS

"3rd Generation Partnership Project; Technical Specification Group Radio Access Network; Evolved Universal Terrestrial Radio Access (E-UTRA); Physical layer procedures (Release 8)," Technical Specification, 3GPP TS 36.213 V8.8.0, Sep. 2009, 77 pages.
English Translation of Mexican Office Action dated Mar. 14, 2014, for corresponding MX Patent Application No. MX/a/2012/008237, 11 pages.
Ericsson, ST-Ericsson, "Some considerations on dual layer beamforming," R1-092732, Agenda Item: 14, 3GPP TSG-RAN WG1 #57bis, Los Angeles, CA, USA, Jun. 29-Jul. 3, 2009, 3 pages.
Huawei, "Analysis of Multiplexing Schemes of Control and Data in Multi-layer PUSCH Transmission," R1-101967, Agenda Item: 6.4.4, 3GPP TSG RAN WG1 meeting #60-BIS, Beijing, China, Apr. 12-16, 2010, 6 pages.
International Search Report, for corresponding International Application No. PCT/JP2011/000726, dated Mar. 15, 2011, 4 pages.
LG Electronics, "Multiplexing scheme with UCI and data on PUSCH," R1-102387, Agenda Item: 6.4.4, 3GPP TSG RAN WG1 #60bis, Beijing, China, Apr. 12-16, 2010, 3 pages.
English Translation of Search Report for corresponding TW Application No. 100104304, 1 page.
Extended European Search Report dated Mar. 2, 2017, for EP Application No. 11742031.5-1875/2536052, 4 pages.
Panasonic, "PDCCH design for carrier aggregation," R1-092230, Agenda Item: 15.4, 3GPP TSG-RAN WG1 Meeting #57, San Francisco, USA, May 4-8, 2009, 9 pages.

* cited by examiner

TERMINAL AND COMMUNICATION METHOD THEREOF

BACKGROUND

Technical Field

The present invention relates to a terminal and a communication method thereof.

Description of the Related Art

When there is a data signal on an uplink of 3GPP LTE (3rd Generation Partnership Project Long Term Evolution), the data signal and control information are time-multiplexed and transmitted using PUSCH (Physical Uplink Shared CHannel) to maintain low CM (Cubic Metric). This control information includes a response signal (acknowledgment/negative acknowledgment (ACK/NACK)) and channel quality (Channel Quality Indicator, hereinafter, referred to as "CQI").

Different assignment methods are employed for these ACK/NACK and CQI (e.g., see Non-Patent Literatures 1 and 2). To be more specific, some data signals (4 symbols) mapped to resources adjacent to pilot signals (Reference Signal, RS) are punctured and ACK/NACK signals are thereby arranged in some of the resources. On the other hand, CQI is arranged over an entire subframe (2 slots). At this time, since data signals are arranged in resources other than resources in which CQI is arranged, the data signals are never punctured by CQI (see FIG. 1). This is because whether or not ACK/NACK is assigned is determined according to the presence or absence of downlink data signals. That is, since it is more difficult to predict the occurrence of ACK/NACK than predict the occurrence of CQI, puncturing that allows resources to be assigned even when ACK/NACK occurs suddenly is used when mapping ACK/NACK. On the other hand, in the case of CQI, since transmission timing (subframe) is determined beforehand by report information, it is possible to determine resources of data signals and CQI. Since ACK/NACK is important information, ACK/NACK is assigned to symbols close to pilot signals whose channel estimation accuracy is high. This makes it possible to reduce ACK/NACK errors.

Here, MCS (Modulation and Coding Rate Scheme) corresponding to uplink data signals is determined by the base station based on uplink channel quality. Furthermore, MCS of uplink control information is determined by adding an offset to MCS of data signals. To be more specific, since control information is information more important than data signals, MCS of a lower transmission rate than that of MCS of data signals is set for MCS of control information. This allows control information to be transmitted with high quality.

Furthermore, standardization of 3GPP LTE-Advanced which realizes faster communication than 3GPP LTE has been started. The 3GPP LTE-Advanced system (hereinafter may also be referred to as "LTE-A system") follows the 3GPP LTE system (hereinafter may also be referred to as "LTE system"). 3GPP LTE-Advanced is expected to introduce base stations and terminals communicable at a wide band frequency of 40 MHz or higher to realize a downlink transmission rate of a maximum of 1 Gbps.

Studies are being carried out on the support of SU (Single User)-MIMO communication on LTE-Advanced uplinks. In SU-MIMO communication, a data signal is generated with a plurality of codewords (CWs) and CWs are transmitted in different layers. For example, CW #0 is transmitted in layer #0 and CW #1 is transmitted in layer #1. Here, "codeword" can be interpreted as a unit of retransmitting a data signal. On the other hand, "layer" is synonymous to "stream."

Furthermore, studies are being carried out on "Layer Shifting" that changes a layer of each CW for every slot (or symbol) to average channel quality of each CW in LTE-Advanced (see FIG. 2). For example, in slot #0, CW #0 is transmitted in layer #0 and CW #1 is transmitted in layer #1. On the other hand, in slot #1, CW #0 is transmitted in layer #1 and CW #1 is transmitted in layer #0. Thus, effects of space diversity are obtained in CW #0 and CW #1.

LTE-Advanced downlinks support carrier aggregation that uses a plurality of downlink unit bands (CC: Component Carrier) for data transmission. When this carrier aggregation scheme is used, A/N is generated for a downlink data signal of each CC. Therefore, A/N needs to be transmitted for a plurality of CCs on uplinks.

CITATION LIST

Non-Patent Literature

NPL 1
TS36.212 v8.7.0, "3GPP TSG RAN; Evolved Universal Terrestrial Radio Access (E-UTRA); Multiplexing and channel coding NPL 2
TS36.213 v8.8.0, "3GPP TSG RAN; Evolved Universal Terrestrial Radio Access (E-UTRA); Physical Layer Procedure

BRIEF SUMMARY

Technical Problem

However, non-MIMO transmission is assumed to be a precondition for uplinks of the systems disclosed in Non-Patent Literatures 1 and 2 above. In this non-MIMO transmission, only one layer is used in each terminal. That is, data signals and control information (ACK/NACK, CQI) are transmitted in one layer as described above.

In contrast to this, studies are being carried out on MIMO transmission that transmits data signals in a plurality of layers on an LTE-Advanced uplink. In this case, it is assumed as a first method that data signals are transmitted in a plurality of layers and ACK/NACK and CQI are transmitted in one of the plurality of layers. In this case, for example, all of data signals, ACK/NACK and CQI are assigned to layer #0 and only data signals are assigned to layer #1. Furthermore, it is assumed as a second method that all of data signals, ACK/NACK and CQI are transmitted in a plurality of layers. For example, all of data signals, ACK/NACK and CQI are assigned to layers #0 and #1.

That is, it is assumed in LTE-Advanced that all of data signals, ACK/NACK and CQI are assigned to common layers.

Furthermore, LTE-Advanced supports carrier aggregation as described above. In this case, ACK/NACK is generated for downlink data on a downlink of each CC. In this case, ACK/NACK needs to be transmitted to a plurality of CCs on an uplink. Furthermore, studies are also being carried out in LTE-Advanced on an asymmetric carrier aggregation scheme in which ACK/NACK for downlink data transmitted with N (N≥2) downlink CCs is transmitted with less than N uplink CCs. Therefore, when asymmetric carrier aggregation is adopted and the number of ACKs/NACKs transmitted on an uplink increases, the probability that ACK/NACK may intrude into a CQI region assigned to CQI (that is, probability that ACK/NACK may be unavoidably mapped to the CQI region) increases in both the first method and the second method and CQI is punctured by ACK/NACK (see FIG. 3). As a result, there is a problem that CQI-related reception errors are more likely to occur.

It is an object of the present invention to provide a terminal and a communication method thereof capable of preventing degradation of the error characteristic of control information even in a case of employing an asymmetric carrier aggregation scheme and employing a MIMO transmission method on an uplink.

Solution to Problem

An aspect of a terminal according to the present invention includes a reception section that receives downlink data using N (N is a natural number equal to or greater than 2) downlink component carriers, an error detection section that detects an error of the downlink data, a transmission signal forming section that forms a transmission signal by arranging the error detection result and downlink quality information in a plurality of layers based on an arrangement rule, and a transmission section that transmits the transmission signal using uplink component carriers corresponding to the N downlink component carriers, wherein according to the arrangement rule, the error detection result is preferentially arranged in a layer different from a layer in which the channel quality information is arranged.

An aspect of a communication method according to the present invention includes the steps of: receiving downlink data using N (N is a natural number equal to or greater than 2) downlink component carriers, detecting errors of the downlink data, forming a transmission signal by arranging the error detection result and downlink quality information in a plurality of layers based on an arrangement rule, and transmitting the transmission signal using uplink component carriers corresponding to the N downlink component carriers, wherein according to the arrangement rule, the error detection result is preferentially arranged in a layer different from a layer in which the channel quality information is arranged.

Advantageous Effects of Invention

According to the present invention, it is possible to provide a terminal and a communication method thereof capable of preventing degradation of the error characteristic of control information even in a case of employing an asymmetric carrier aggregation scheme and employing a MIMO transmission method on an uplink.

DETAILED DESCRIPTION

Figure 1:
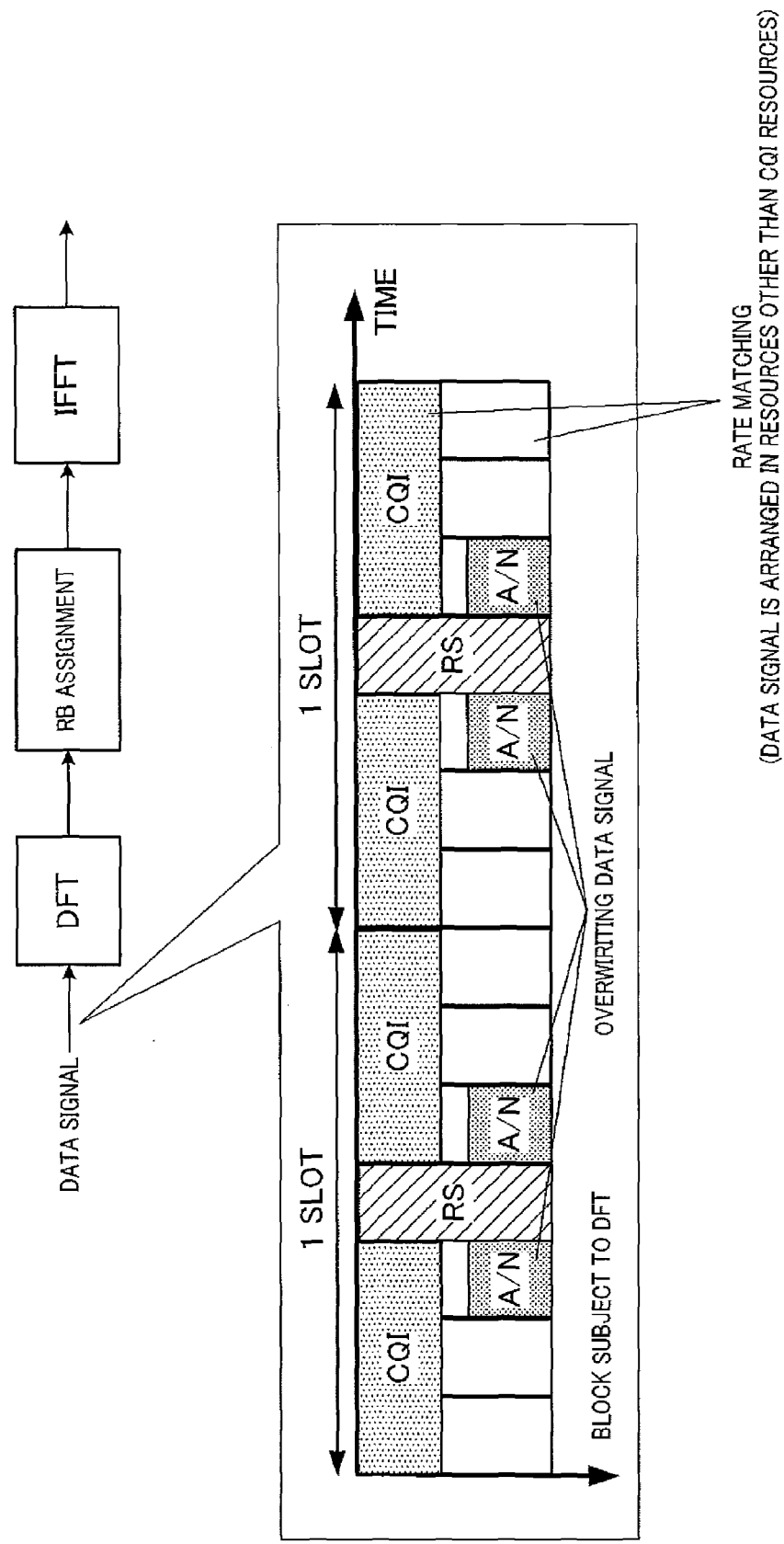
FIG. 1 is a diagram illustrating a conventional method of arranging ACK/NACK and CQI.
Figure 2:
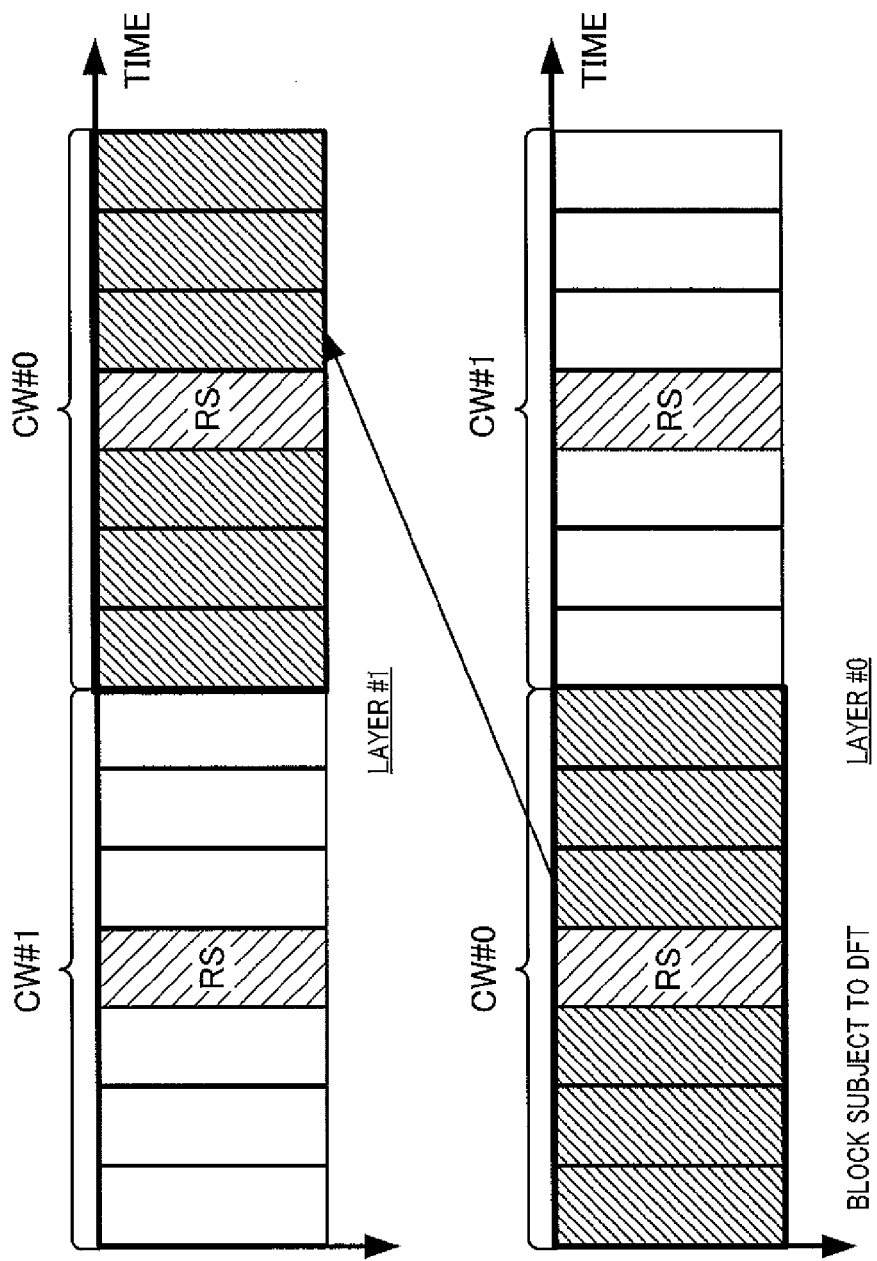
FIG. 2 is a diagram illustrating layer shifting.
Figure 3:
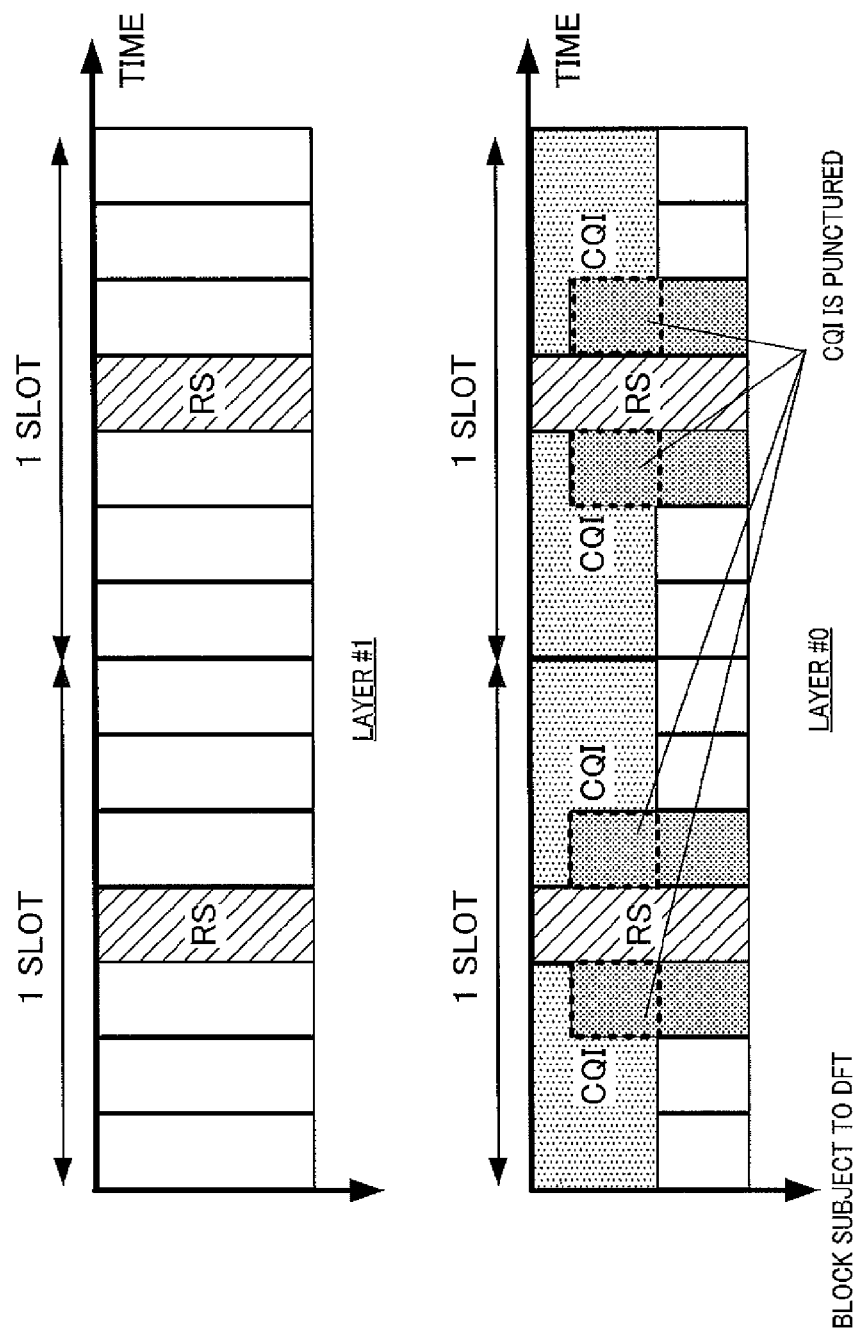
FIG. 3 is a diagram illustrating a problem to be solved.

Hereinafter, embodiments of the present invention will be described in detail with reference to the accompanying drawings.

Identical components among embodiments will be assigned the same reference numerals and overlapping explanations thereof will be omitted.

Embodiment 1

Overview of Communication System

A communication system including base station 100 and terminal 200, which will be described later, performs communication using M (M≥1) uplink component carriers and N (N≥2, N>M) downlink component carriers associated with the uplink component carriers, that is, asymmetric carrier aggregation.

Furthermore, communication between base station 100 and terminal 200 without carrier aggregation is also possible depending on resource assignment to terminal 200 by base station 100.

Furthermore, when communication without carrier aggregation is performed in this communication system, conventional ARQ is performed. That is, ACK/NACK corresponding to downlink data transmitted in an arbitrary downlink component carrier is transmitted in an uplink component carrier associated in a one-to-one correspondence with the arbitrary downlink component carrier. On the other hand, when communication through asymmetric carrier aggregation is performed, ACK/NACK is transmitted using any one of the above M uplink component carriers. That is, this communication system is, for example, an LTE-A system, base station 100 is, for example, an LTE-A base station and terminal 200 is an LTE-A terminal.

[Configuration of Base Station]

Figure 4:
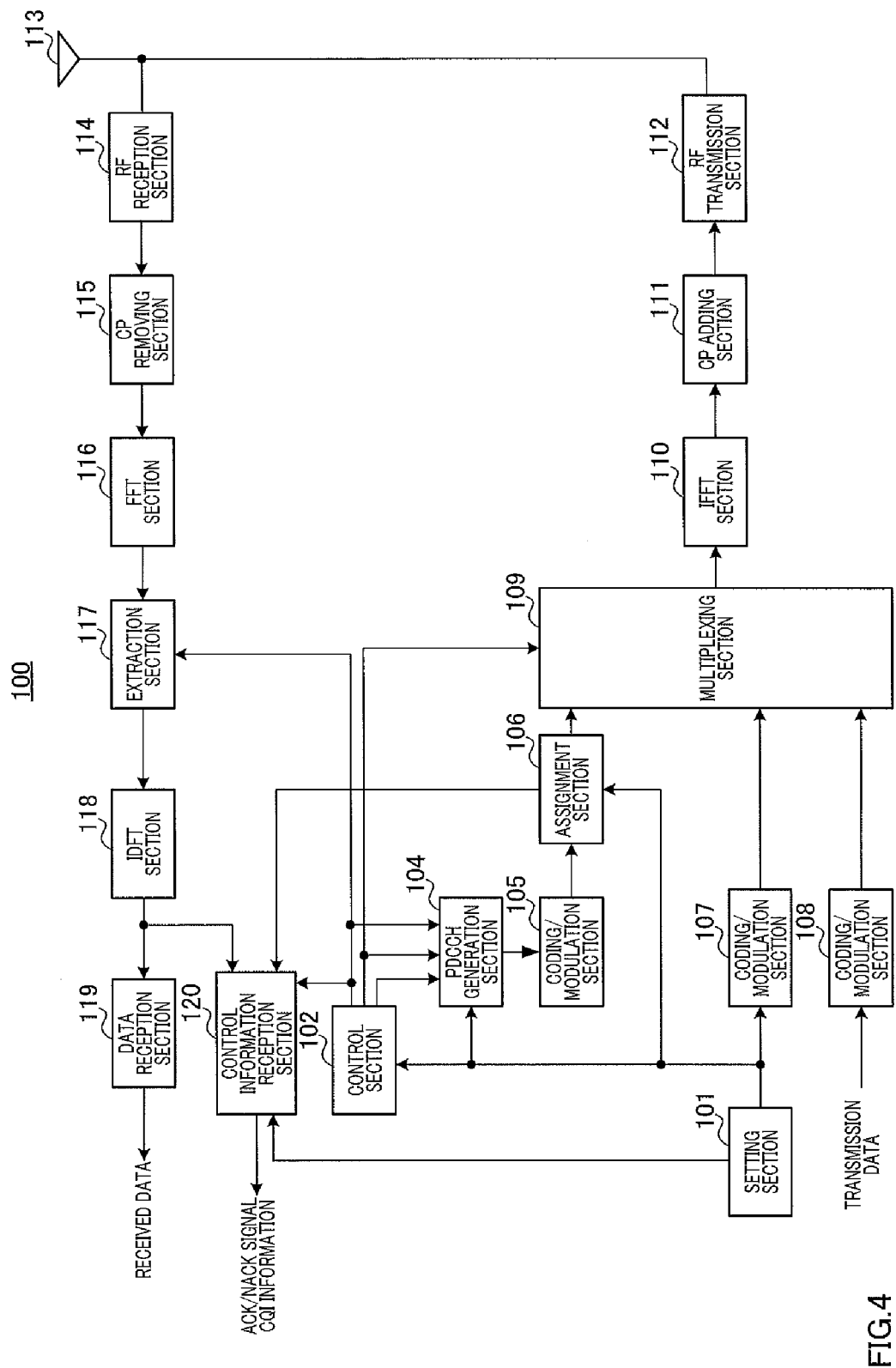
FIG. 4 is a block diagram illustrating a configuration of a base station according to Embodiment 1 of the present invention.

FIG. 4 is a block diagram showing a configuration of base station 100 according to Embodiment 1 of the present invention. In FIG. 4, base station 100 includes setting section 101, control section 102, PDCCH generation section 104, coding/modulation sections 105, 107 and 108, assignment section 106, multiplexing section 109, IFFT (Inverse Fast Fourier Transform) section 110, CP (Cyclic Prefix) adding section 111, RF transmission section 112, antenna 113, RF reception section 114, CP removing section 115, FFT (Fast Fourier Transform) section 116, extraction section 117, IDFT (Inverse Discrete Fourier Transform) section 118, data reception section 119 and control information reception section 120.

Setting section 101 sets the number of uplink component carriers and downlink component carriers in communication with a setting target terminal (hereinafter information regarding this number is simply referred to as "information on the number of component carriers") and a transmission mode in the uplink component carrier and downlink component carrier based on terminal transmission/reception capability (UE Capability) of the setting target terminal or channel situation. This transmission mode is set for each component carrier. Furthermore, when there is a plurality of setting target terminals, this transmission mode is set for each terminal.

This transmission mode includes, for example, a transmission mode using transmission diversity defined in LTE, transmission mode using spatial multiplexing MIMO, transmission mode using rank 1 precoding, MU-MIMO transmission mode, beam forming transmission mode, and "multiantenna mode" as a transmission mode common to MIMO and CoMP transmission directed to an LTE-A terminal. Furthermore, the uplink transmission mode also includes a MIMO transmission mode and transmission mode using discontinuous band assignment. The aforementioned transmission mode using spatial multiplexing MIMO, multiantenna transmission mode, and MIMO transmission mode will be referred to, but not limited to, as "MIMO mode," whereas the transmission mode using transmission diversity, transmission mode using rank 1 precoding, MU-MIMO transmission mode, beam forming transmission mode and transmission mode using discontinuous band assignment will be referred to as "Non-MIMO mode."

Setting section 101 outputs setting information including information on the number of component carriers and transmission mode information indicating a transmission mode set in the setting target terminal, to control section 102, PDCCH generation section 104, assignment section 106, coding/modulation section 107 and control information reception section 120. The above-described setting information is reported to each terminal via coding/modulation section 107 as control information (that is, RRC control information) of a higher layer.

Furthermore, setting section 101 outputs CQI instruction information instructing a terminal on feedback of information (CQI) regarding downlink channel quality to PDCCH generation section 104.

Furthermore, setting section 101 sets CCE (Control Channel Element) for assigning PDCCH in a setting target terminal for each component carrier. When there is a plurality of setting target terminals, this setting is performed for each terminal. This CCE setting information is outputted to assignment section 106. Each PDCCH occupies resources configured by one or a plurality of consecutive CCEs.

Control section 102 generates assignment control information (DCI) according to the information on the number of component carriers and transmission mode information included in the setting information received from setting section 101. This DCI is generated for each assignment target terminal. Furthermore, regarding one assignment target terminal, this DCI is generated for each component carrier.

For example, control section 102 generates assignment control information including MCS information for one transport block, resource (RB) assignment information and HARQ information for a terminal in a transmission diversity mode according to DCI format 1.

Furthermore, control section 102 generates assignment control information including MCS information for two transport blocks for a terminal in a MIMO transmission mode according to DCI format 2.

Here, the assignment control information generated by control section 102 includes uplink assignment control information indicating uplink resources (e.g., PUSCH (Physical Uplink Shared Channel)) for assigning uplink data of a terminal and downlink assignment control information indicating downlink resources (e.g., PDSCH (Physical Downlink Shared Channel)) for assigning downlink data directed to the terminal.

Furthermore, control section 102 sets whether or not each terminal uses layer shifting on an uplink and generates information indicating the presence or absence of layer shifting.

Furthermore, control section 102 can also use assignment control information (DCI 0/1A) common to all terminals in addition to assignment control information according to the aforementioned transmission mode per terminal.

During normal data transmission, control section 102 generates assignment control information in a format (DCI 1, 2, 2A, 2B, 2C, 2D, 0A, 0B) according to a transmission mode of each terminal. This allows data to be transmitted in a transmission mode set in each terminal, and can thereby improve throughput.

However, depending on a drastic change in a channel situation or a change in interference from neighboring cells or the like, there may also be a situation in which reception errors occur frequently in the transmission mode set in each terminal. In this case, control section 102 generates assignment control information in a format (DCI 0/1A) common to all terminals (that is, assignment control information is generated in a format in a default transmission mode). This allows more robust transmission.

Furthermore, control section 102 generates assignment control information in a format (e.g., DCI 1C, 1A) directed to a common channel in addition to assignment control information for terminal-specific data assignment. The assignment control information directed to a common channel is used to assign common data such as broadcast information and paging information to a plurality of terminals.

Control section 102 outputs MCS information and HARQ information out of the assignment control information for assignment of the generated terminal-specific data to PDCCH generation section 104, outputs uplink resource assignment information and information indicating the presence or absence of uplink layer shifting to PDCCH generation section 104, extraction section 117 and control information reception section 120 and outputs downlink resource assignment information to PDCCH generation section 104 and multiplexing section 109. Furthermore, control section 102 outputs the generated assignment control information directed to a common channel to PDCCH generation section 104.

PDCCH generation section 104 generates a PDCCH signal including assignment control information for terminal-specific data assignment inputted from control section 102 (that is, uplink resource assignment information per terminal, downlink resource assignment information, information indicating the presence or absence of layer shifting, MCS information and HARQ information or the like) or a PDCCH signal including assignment control information directed to a common channel (that is, broadcast information and paging information common to terminals or the like) and CQI instruction information of CQI feedback per component carrier inputted from setting section 101. At this time, PDCCH generation section 104 adds a CRC bit to the uplink assignment control information and downlink assignment control information generated for each terminal and further masks (or scrambles) the CRC bit with a terminal ID. PDCCH generation section 104 then outputs the masked PDCCH signal to coding/modulation section 105.

Coding/modulation section 105 modulates the PDCCH signal inputted from PDCCH generation section 104 after channel coding and outputs the modulated PDCCH signal to assignment section 106. Here, coding/modulation section 105 sets a coding rate so that sufficient received quality is obtained in each terminal based on CQI reported from each terminal. For example, coding/modulation section 105 sets a lower coding rate for a terminal located closer to a cell boundary (terminal having poor channel quality).

Assignment section 106 receives the PDCCH signal including the assignment control information directed to a common channel and the PDCCH signal including the assignment control information for terminal-specific data assignment to each terminal from coding/modulation section 105. The PDCCH signal is inputted for each component carrier of the mapping destination. Assignment section 106 assigns the PDCCH signal to CCE indicated by the CCE setting information received from setting section 101.

Assignment section 106 outputs the PDCCH signal assigned to CCE per component carrier to multiplexing section 109. Furthermore, assignment section 106 outputs information indicating CCE to which the PDCCH signal is assigned for each component carrier to control information reception section 120.

Coding/modulation section 107 modulates the setting information inputted from setting section 101 after channel coding and outputs the modulated setting information to multiplexing section 109.

Coding/modulation section 108 inputs a transport block for each CC. Coding/modulation section 108 maps the inputted transport block for each CC to a codeword corresponding to each CC and thereby performs channel coding and modulation. That is, CRC is added for each codeword (hereinafter referred to as "codeword block") in each CC. This allows the receiving side to perform error detection per codeword block. The modulated codeword obtained in this way (that is, data signal) is outputted to multiplexing section 109.

Multiplexing section 109 multiplexes the PDCCH signal from assignment section 106, setting information from coding/modulation section 107 and data signal (that is, PDSCH signal) from coding/modulation section 108 in each component carrier. Here, multiplexing section 109 maps the PDCCH signal and data signal (PDSCH signal) to each component carrier based on the downlink resource assignment information from control section 102. Multiplexing section 109 may also map the setting information to PDSCH.

Furthermore, multiplexing section 109 multiplexes data signals for MIMO transmission between layers (that is, between virtual channels in the space).

Multiplexing section 109 then outputs the multiplexed signal to IFFT section 110.

IFFT section 110 transforms the multiplexed signal inputted from multiplexing section 109 into a time waveform and CP adding section 111 adds a CP to this time waveform to thereby obtain an OFDM signal.

RF transmission section 112 applies radio transmission processing (up-conversion, digital/analog (D/A) conversion or the like) to the OFDM signal inputted from CP adding section 111 and transmits the OFDM signal via antenna 113. Here, FIG. 4 shows only one antenna 113 for convenience of description, but base station 100 is actually provided with a plurality of antennas 113.

On the other hand, RF reception section 114 applies radio reception processing (down-conversion, analog/digital (A/D) conversion or the like) to a received radio signal received in a reception band via antenna 113 and outputs the received signal obtained to CP removing section 115.

CP removing section 115 removes a CP from the received signal and FFT section 116 transforms the received signal without the CP into a frequency domain signal.

Extraction section 117 extracts uplink data from the frequency domain signal received from FFT section 116 based on the uplink resource assignment information from control section 102 and information indicating the presence or absence of layer shifting. When input signals are spatially multiplexed (that is, when a plurality of CWs are used), extraction section 117 also performs processing of separating CWs.

IDFT section 118 transforms the extracted signal into a time domain signal and outputs the time domain signal to data reception section 119 and control information reception section 120.

Data reception section 119 decodes the time domain signal inputted from IDFT section 118. Data reception section 119 outputs the decoded uplink data as received data.

Control information reception section 120 extracts ACK/NACK or CQI from each terminal corresponding to downlink data (PDSCH signal) out of the time domain signal inputted from IDFT section 118 from the channel (e.g., PUSCH (Physical Uplink Shared Channel)) to which an uplink data signal is assigned. This extraction processing is performed based on information on the number of component carriers inputted from setting section 101, information on the transmission mode, instruction information on downlink CQI in each component carrier inputted from setting section 101, information on MCS inputted from control section 102 and information indicating the presence or absence of layer shifting. The positions at which ACK/NACK and CQI signals transmitted using PUSCH are assigned will be described later.

Alternatively, control information reception section 120 extracts ACK/NACK or CQI from each terminal corresponding to downlink data (PDSCH signal) out of the time domain signal inputted from IDFT section 118 from an uplink control channel (e.g., PUCCH (Physical Uplink Control Channel)) associated with CCE used to assign downlink data. This extraction processing is performed based on information inputted from assignment section 106 (CCE information or the like) and downlink CQI inputted from setting section 101. Furthermore, the uplink control channel is an uplink control channel associated with CCE assigned to the downlink data. CCE and PUCCH are associated with each other to eliminate the necessity for signaling to report PUCCH to be used by the terminal to transmit a response signal from the base station to each terminal. This allows downlink communication resources to be used efficiently. Therefore, each terminal determines PUCCH to be used to transmit an ACK/NACK signal based on CCE to which control information (PDCCH signal) for the terminal is mapped according to this association. Here, it is assumed that when a data signal exists in the received signal, ACK/NACK and CQI are assigned to PUSCH, whereas when no data signal exists in the received signal, ACK/NACK and CQI are assigned to the uplink control channel (e.g., PUCCH).

[Configuration of Terminal]

Figure 5:
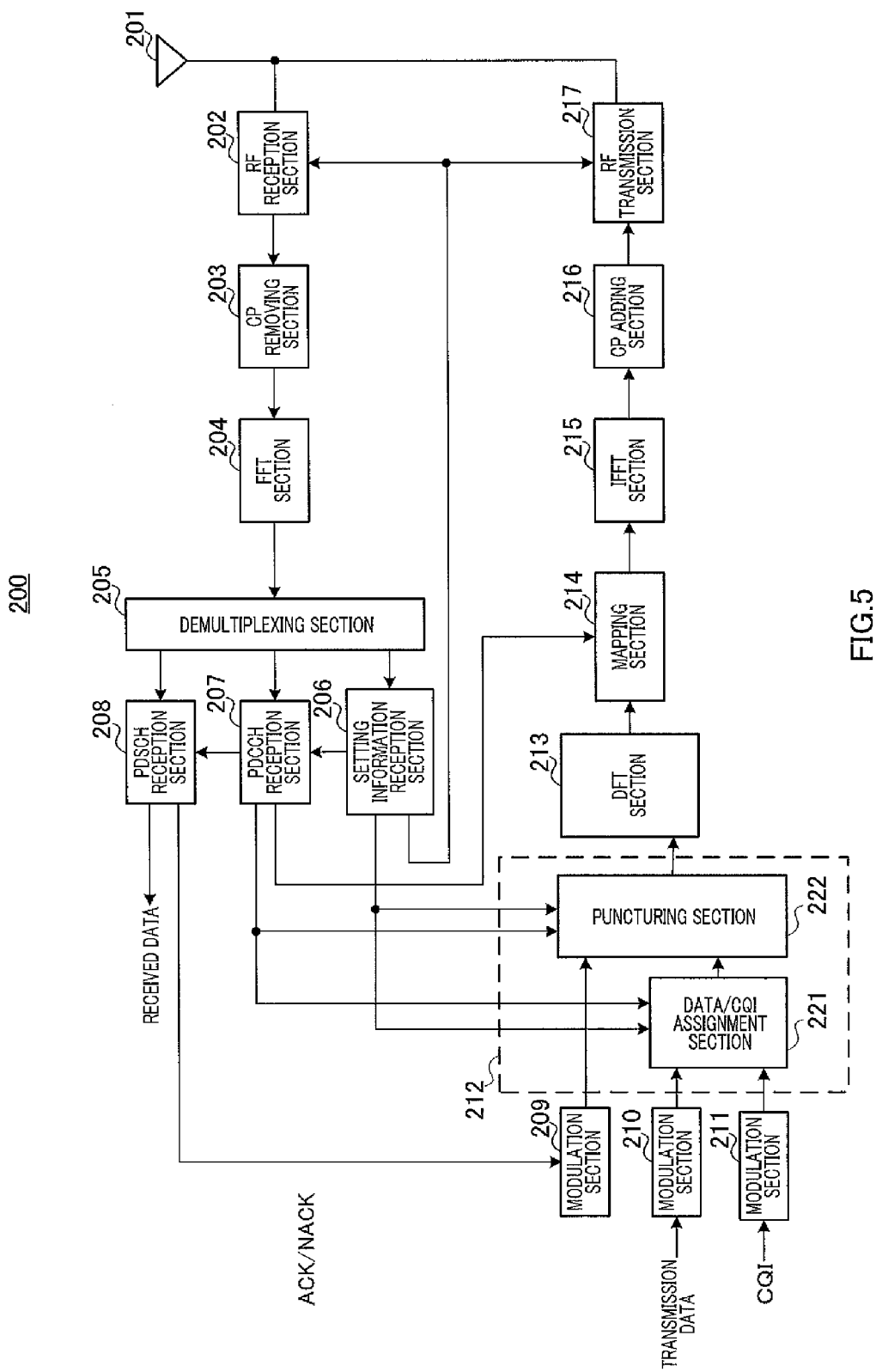
FIG. 5 is a block diagram illustrating a configuration of a terminal according to Embodiment 1 of the present invention.

FIG. 5 is a block diagram showing a configuration of terminal 200 according to Embodiment 1 of the present invention. Terminal 200 is an LTE-A terminal, receives a data signal (downlink data) and transmits an ACK/NACK signal for the data signal to base station 100 using PUCCH or PUSCH. Furthermore, terminal 200 transmits CQI to base station 100 according to the instruction information reported using PDCCH.

In FIG. 5, terminal 200 includes antenna 201, RF reception section 202, CP removing section 203, FFT section 204, demultiplexing section 205, setting information reception section 206, PDCCH reception section 207, PDSCH reception section 208, modulation sections 209, 210 and 211, transmission signal forming section 212, DFT section 213, mapping section 214, IFFT section 215, CP adding section 216 and RF transmission section 217.

RF reception section 202 sets a reception band based on band information received from setting information reception section 206. RF reception section 202 applies radio reception processing (down-conversion, analog/digital (A/D) conversion or the like) to a radio signal (here, OFDM signal) received in the reception band via antenna 201 and outputs the received signal obtained to CP removing section 203. The received signal includes control information of a higher layer including a PDSCH signal, PDCCH signal and setting information.

CP removing section 203 removes a CP from the received signal and FFT section 204 transforms the received signal without CP into a frequency domain signal. This frequency domain signal is outputted to demultiplexing section 205.

Demultiplexing section 205 demultiplexes the signal received from FFT section 204 into a control signal of a higher layer (e.g., RRC signaling) including setting information, PDCCH signal and data signal (that is, PDSCH signal). Demultiplexing section 205 then outputs the control signal to setting information reception section 206, outputs the PDCCH signal to PDCCH reception section 207 and outputs the PDSCH signal to PDSCH reception section 208.

Setting information reception section 206 reads information indicating terminal ID set in terminal 200 from the control signal received from demultiplexing section 205 and outputs the read information as terminal ID information to PDCCH reception section 207. Furthermore, setting information reception section 206 reads information indicating the transmission mode set in terminal 200 and outputs the read information as transmission mode information to PDCCH reception section 207 and transmission signal forming section 212.

PDCCH reception section 207 blind-decodes (monitors) the PDCCH signal inputted from demultiplexing section 205 and obtains a PDCCH signal directed to terminal 200. Here, PDCCH reception section 207 blind-decodes a DCI format (e.g., DCI 0/1A) for data assignment common to all terminals, a transmission mode dependent DCI format (e.g., DCI 1, 2, 2A, 2C, 2D, 0A, 0B) set in terminal 200 and a DCI format (e.g., DCI 1C, 1A) directed to common channel assignment common to all terminals, and thereby obtains a PDCCH signal including assignment control information in each DCI format.

PDCCH reception section 207 then outputs downlink resource assignment information included in the PDCCH signal directed to terminal 200 to PDSCH reception section 208, outputs uplink resource assignment information and information indicating the presence or absence of layer shifting to mapping section 214 and outputs CQI-related instruction information and information indicating the presence or absence of layer shifting to transmission signal forming section 212. Furthermore, PDCCH reception section 207 outputs a CCE number (CCE number of the first CCE when the number of CCEs connected is plural) of CCE in which a PDCCH signal directed to terminal 200 is detected (CCE corresponding to CRC=OK) to mapping section 214.

PDSCH reception section 208 extracts received data (downlink data) from the PDSCH signal inputted from demultiplexing section 205 based on downlink resource assignment information inputted from PDCCH reception section 207 for each component carrier.

Furthermore, PDSCH reception section 208 performs error detection on the extracted received data (downlink data).

When an error detection result shows that there is an error in the received data, PDSCH reception section 208 generates NACK as an ACK/NACK signal, whereas PDSCH reception section 208 generates ACK as an ACK/NACK signal when there is no error in the received data. The ACK/NACK signal generated in each component carrier is outputted to modulation section 209.

Modulation section 209 modulates the ACK/NACK signal inputted from PDSCH reception section 208 and outputs the modulated ACK/NACK signal to transmission signal forming section 212.

Modulation section 210 modulates transmission data (uplink data) and outputs the modulated data signal to transmission signal forming section 212.

Modulation section 211 modulates CQI and outputs the modulated data signal to transmission signal forming section 212.

In the case of a MIMO transmission mode, transmission signal forming section 212 arranges ACK/NACK signals (that is, error detection result of downlink data) and downlink quality information (CQI) in a plurality of layers based on an "arrangement rule" and thereby forms a transmission signal.

To be more specific, transmission signal forming section 212 includes data/CQI assignment section 221 and puncturing section 222. Data/CQI assignment section 221 and puncturing section 222 arrange data signals, ACK/NACK and CQI based on the transmission mode information inputted from setting information reception section 206, CQI-related instruction information inputted from PDCCH reception section 207 and information indicating the presence or absence of layer shifting.

Data/CQI assignment section 221 arranges CQI in some of a plurality of layers in each slot based on the above-described "arrangement rule." That is, when there is a data signal to be transmitted, data/CQI assignment section 221 arranges CQI and data signals at positions defined in each codeword based on the above-described "arrangement rule" and thereby forms a signal sequence. Furthermore, when the information indicating the presence or absence of layer shifting from PDCCH reception section 207 in the arrangement processing in this data/CQI assignment section 221 indicates "present," the layer in which CQI is arranged is shifted between slots. When there is a data signal to be transmitted, CQI is assigned to PUSCH, whereas when there is no data signal to be transmitted, CQI is assigned to an uplink control channel (e.g., PUCCH). On the other hand, when not receiving CQI instruction information, it goes without saying that data/CQI assignment section 221 does not arrange CQI. Furthermore, in any mode other than the MIMO transmission mode (non-MIMO transmission mode), data signals and CQI are arranged so as to correspond to one layer, that is, in the same way as in FIG. 1.

Puncturing section 222 punctures some of data signals included in the signal sequence received from data/CQI assignment section 221 using ACK/NACK signals based on the above-described "arrangement rule." When there is a data signal to be transmitted, the ACK/NACK signals are assigned to PUSCH, whereas when there is no data signal to be transmitted, the ACK/NACK signals are assigned to an uplink control channel (e.g., PUCCH).

As shown above, transmission signal forming section 212 forms a transmission signal in which CQI and ACK/NACK signals are arranged at resource positions according to the "arrangement rule." This "arrangement rule" will be described in detail later.

DFT section 213 transforms the data signals, ACK/NACK and CQI inputted from puncturing section 222 into a frequency domain signal and outputs a plurality of frequency components obtained to mapping section 214.

Mapping section 214 maps the plurality of frequency components (including ACK/NACK and CQI transmitted on PUSCH) inputted from DFT section 213 according to the uplink resource assignment information inputted from PDCCH reception section 207 to PUSCH arranged in the uplink component carrier. Furthermore, mapping section 214 maps frequency components or code resources of control information components (ACK/NACK and CQI) not transmitted through PUSCH inputted from DFT section 213 to PUCCH according to the CCE number inputted from PDCCH reception section 207.

Modulation section 209, modulation section 210, modulation section 211, data/CQI assignment section 221, puncturing section 222, DFT section 213 and mapping section 214 may also be provided for each component carrier.

IFFT section 215 transforms the plurality of frequency components mapped to PUSCH into a time domain waveform and CP adding section 216 adds a CP to the time domain waveform.

RF transmission section 217 is configured to be able to change the transmission band and sets the transmission band based on the band information inputted from setting information reception section 206. RF transmission section 217 applies radio transmission processing (up-conversion, digital/analog (D/A) conversion or the like) to the signal with the CP added and transmits the signal via antenna 201.

[Operation of Base Station 100 and Terminal 200]

Operation of base station 100 and terminal 200 having the above-described configuration will be described. Here, variations of the arrangement rules in terminal 200 will be mainly described.

<Arrangement Rule 1>

Figure 6:
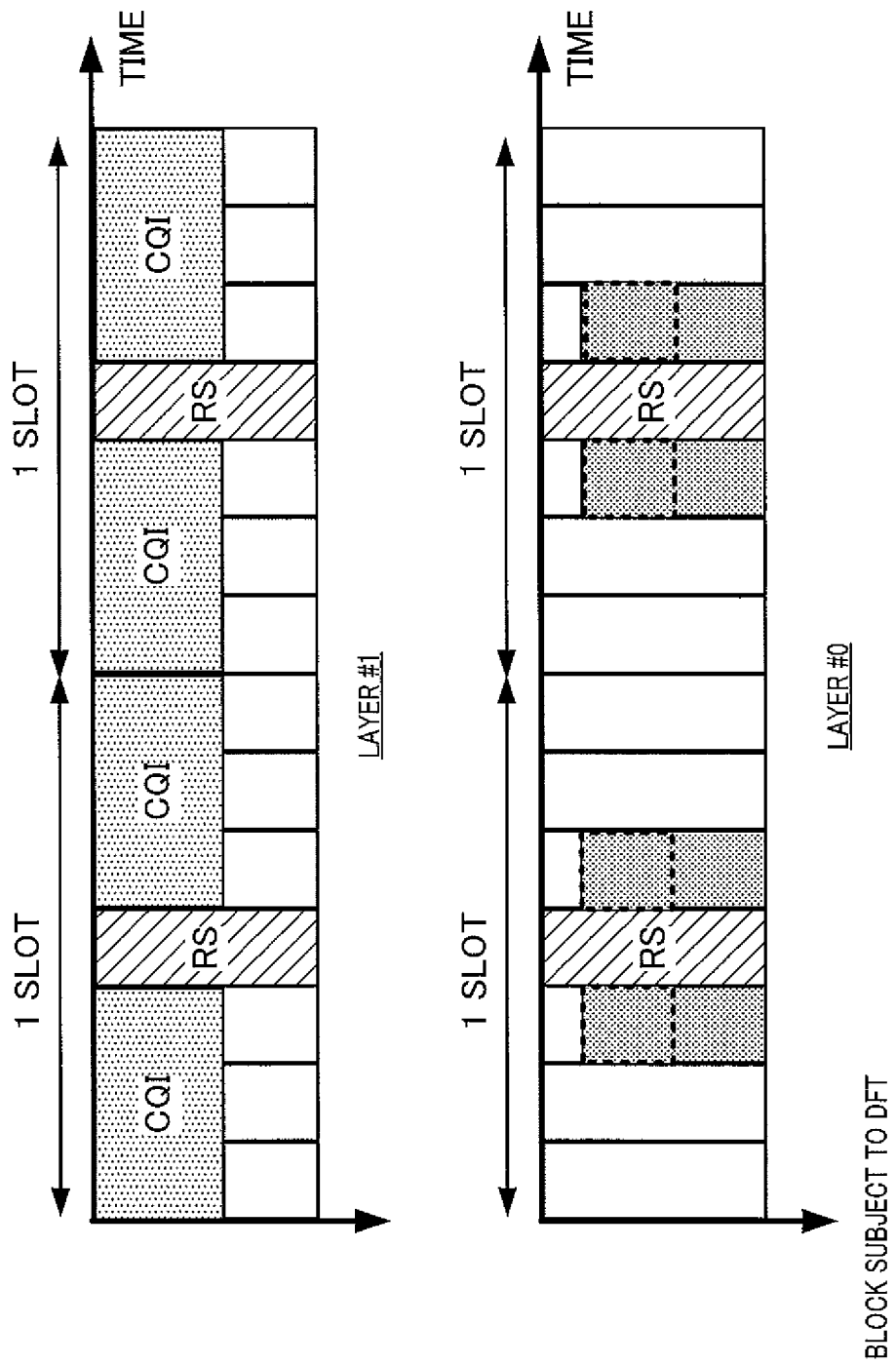
FIG. 6 is a diagram illustrating arrangement rule 1.

FIG. 6 is a diagram illustrating arrangement rule 1. According to arrangement rule 1, ACK/NACK signals are arranged in a layer different from a layer in which CQI is arranged. This prevents CQI from being punctured by ACK/NACK, and can thereby reduce a CQI-related error rate.

Furthermore, according to arrangement rule 1, ACK/NACK signals may be preferentially arranged in a layer different from the layer in which CQI is arranged.

To be more specific, according to arrangement rule 1, when the number of downlink component carriers N used for downlink communication is less than a predetermined threshold (that is, when the number of ACK/NACK signals is a small number), ACK/NACK signals are only arranged in a layer different from the layer in which CQI is arranged, whereas when N is equal to or greater than the threshold, ACK/NACK signals may also be arranged in a layer different from the layer in which CQI is arranged or in the same layer as the layer in which CQI is arranged. ACK/NACK signals are arranged in this way for the following reasons. That is, the amount of ACK/NACK or CQI transmitted increases as the number of downlink component carriers N used for downlink communication increases. For this reason, ACK/NACK or CQI may exceed the maximum amount of ACK/NACK or CQI transmitted in one layer and some ACK/NACK or CQI may not be able to be transmitted in the one layer. Therefore, when the number of downlink component carriers is large, ACK/NACK and CQI may also be assigned to the same layer and some ACK/NACK or CQI that could not be transmitted in the above-described one layer can be transmitted. When the amount of ACK/NACK or CQI increases, this method is suitable for an environment in which resources capable of arranging ACK/NACK in a layer different from the layer of CQI become deficient.

Here, the layer in which ACK/NACK and CQI are arranged may be predetermined between base station 100 and terminal 200 or may be included in control information or setting information from base station 100 to terminal 200, and reported.

Furthermore, as another method of arrangement rule 1, when the number of downlink component carriers N used for downlink communication is equal to or greater than a predetermined threshold, ACK/NACK signals are arranged in a layer different from the layer in which CQI is arranged. When the number of downlink component carriers N used for downlink communication is less than the predetermined threshold, ACK/NACK signals may be arranged in the same layer as the layer in which CQI is arranged. ACK/NACK signals are arranged in this way for the following reason. That is, the amount of ACK/NACK or CQI transmitted increases as the number of downlink component carriers increases. In such a situation, in order to prevent CQIs from being punctured by ACK/NACK arranged in the same layer, ACK/NACK signals and CQI are arranged in different layers. On the other hand, when the number of downlink component carriers is small, it is possible to reduce the error rate of ACK/NACK or CQI by arranging ACK/NACK or CQI in a plurality of layers to gain transmission power. Even when the amount of ACK/NACK and CQI increases, this method is suitable for an environment in which there are enough resources capable of arranging ACK/NACK in a layer different from that of CQI.

When the number of downlink component carriers N is less than the predetermined threshold, both ACK/NACK and CQI may be assigned to one layer as in the case of the prior art or another assignment method may be used.

<Arrangement Rule 2>

Figure 7:
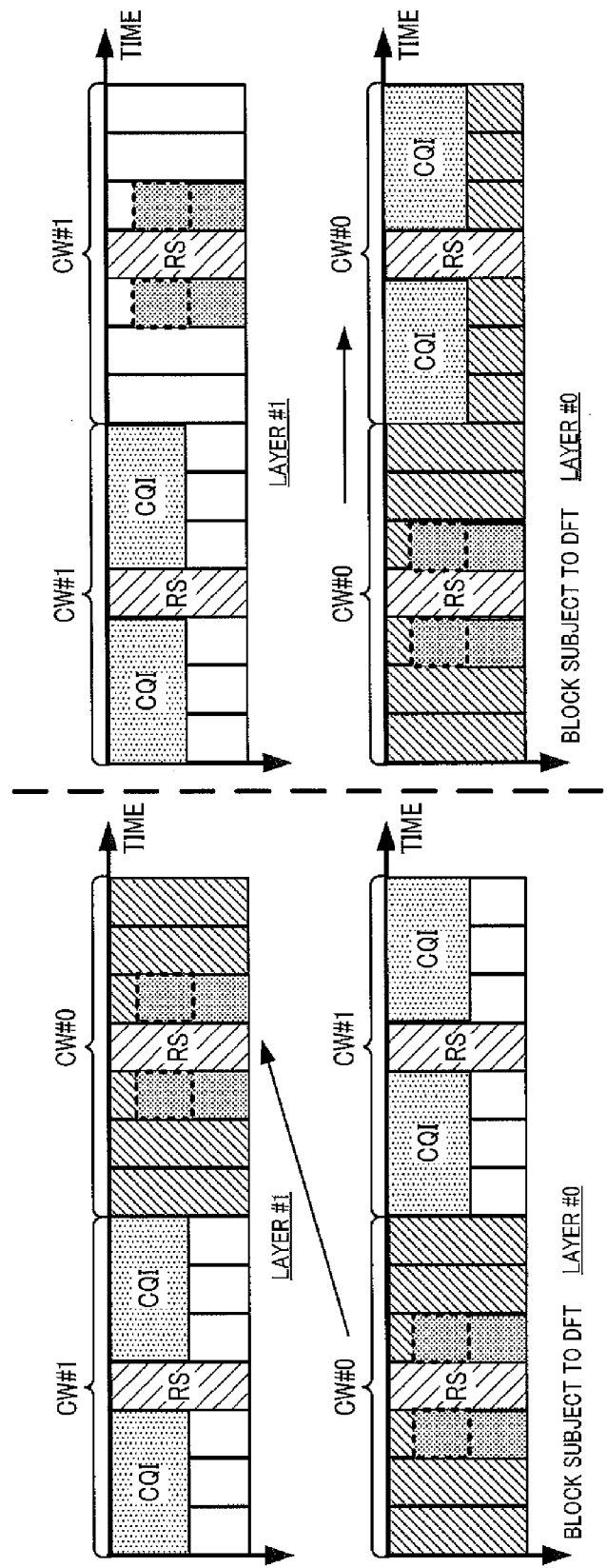
FIG. 7 is a diagram illustrating arrangement rule 2.

FIG. 7 is a diagram illustrating arrangement rule 2. Arrangement rule 2 basically shares a commonality with arrangement rule 1 in that ACK/NACK signals are arranged in a layer different from a layer in which CQI is arranged. According to arrangement rule 2, the layers in which ACK/NACK and CQI are arranged vary from one slot to another irrespective of the presence or absence of layer shifting. That is, according to arrangement rule 2, the layers in which ACK/NACK and CQI are arranged vary for every slot. In other words, layer shifting is performed with respect to ACK/NACK and CQI.

To be more specific, when layer shifting is performed, the layer in which an arbitrary codeword is arranged is changed for every slot. Therefore, when layer shifting is present, arrangement rule 2 is realized by assigning ACK/NACK and CQI to certain codewords (see FIG. 7A). On the other hand, when layer shifting is absent, arrangement rule 2 is realized by changing codewords to be assigned to ACK/NACK and CQI for every slot (see FIG. 7B).

Thus, a space diversity effect can be obtained with respect to ACK/NACK and CQI by performing layer shifting with respect to ACK/NACK and CQI.

<Arrangement Rule 3>

Figure 8:
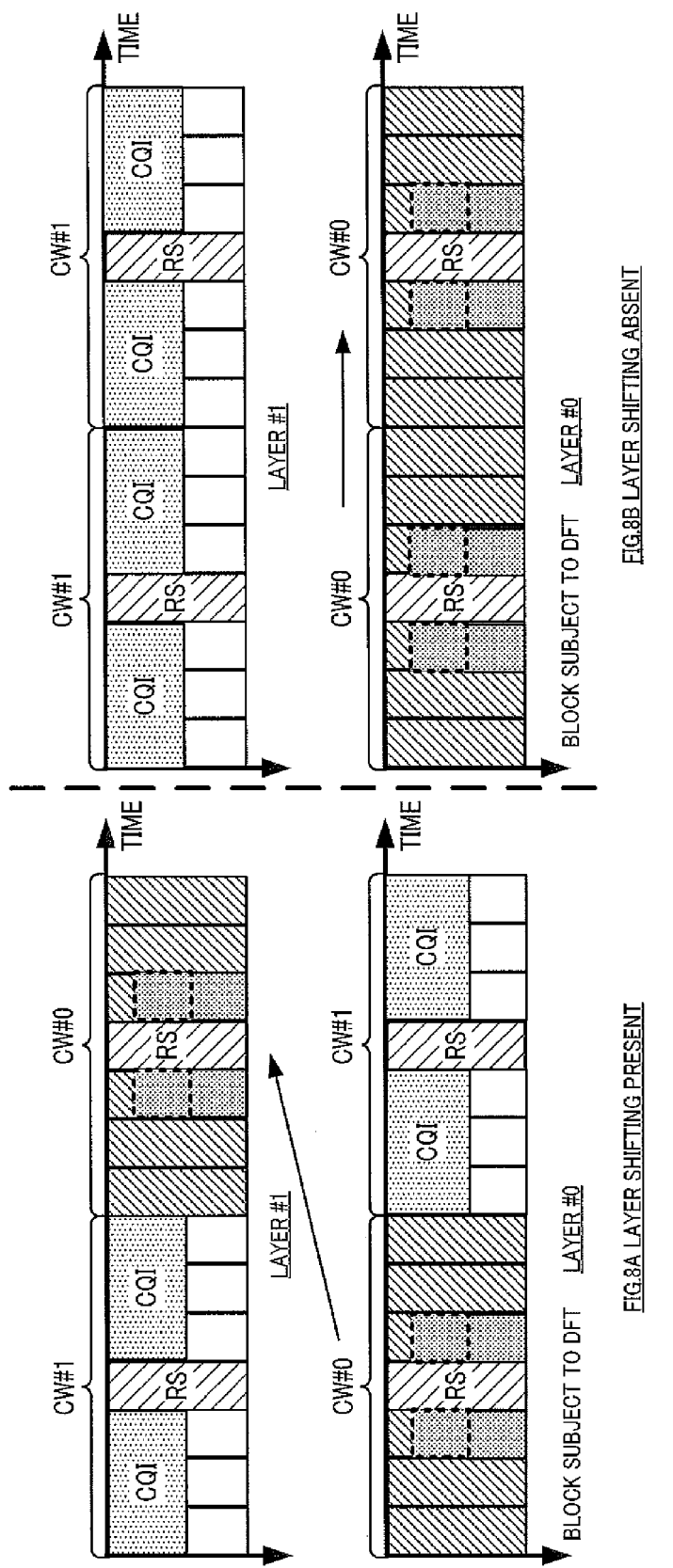
FIG. 8 is a diagram illustrating arrangement rule 3.

FIG. 8 is a diagram illustrating arrangement rule 3. Arrangement rule 3 basically shares a commonality with arrangement rule 1 in that ACK/NACK signals are arranged in a layer different from a layer in which CQI is arranged. According to arrangement rule 3, ACK/NACK and CQI are assigned to certain codewords between slots irrespective of the presence or absence of layer shifting.

To be more specific, when layer shifting is performed, the layer in which an arbitrary codeword is arranged is changed for every slot. Therefore, when layer shifting is present, layer shifting of ACK/NACK and CQI is realized by assigning ACK/NACK and CQI to certain codewords (see FIG. 8A). On the other hand, when layer shifting is absent, ACK/NACK and CQI are also arranged in a certain layer by assigning ACK/NACK and CQI to certain codewords.

Thus, control information applied for every codeword can also be used for ACK/NACK and CQI by assigning ACK/NACK and CQI to certain codewords between slots irrespective of the presence or absence of layer shifting. For example, MCS to be applied to ACK/NACK and CQI can be obtained by adding an offset to MCS applied to data signals in the same way as LTE.

<Arrangement Rule 4>

Figure 9:
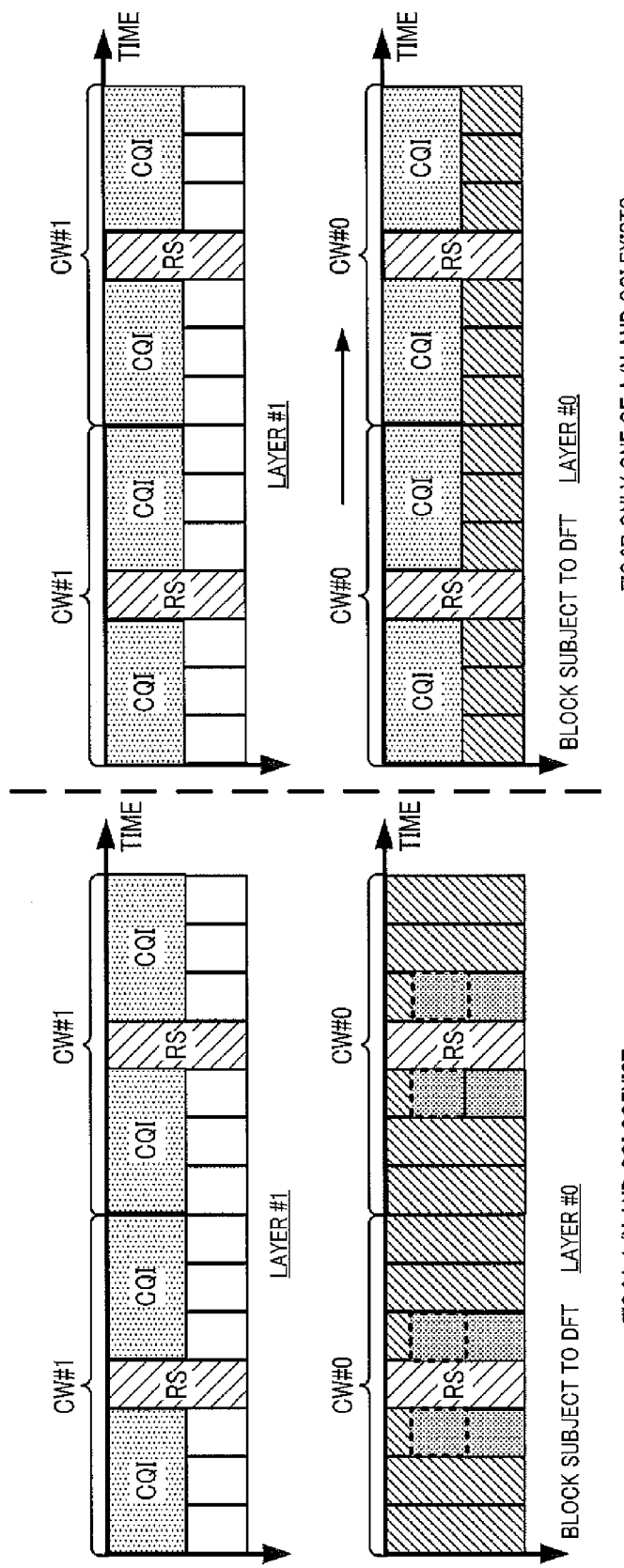
FIG. 9 is a diagram illustrating arrangement rule 4.

FIG. 9 is a diagram illustrating arrangement rule 4. Arrangement rule 4 basically shares a commonality with arrangement rule 1 in that ACK/NACK signals are arranged in a layer different from a layer in which CQI is arranged. According to arrangement rule 4, when only CQI is arranged, the number of layers in which CQI is arranged is greater than that when both ACK/NACK and CQI are arranged. That is, the number of layers assigned to ACK/NACK and CQI is changed depending on whether or not both ACK/NACK and CQI are present.

To be more specific, when both ACK/NACK and CQI are present in each slot, one layer is assigned to ACK/NACK and CQI respectively in each slot (see FIG. 9A). On the other hand, when only one of ACK/NACK and CQI is present in each slot, one of ACK/NACK and CQI is assigned to a plurality of layers in each slot (FIG. 9B). In FIG. 9, the layer to which ACK/NACK and CQI are assigned is fixed between the first slot and second slot, but the layer to which ACK/NACK and CQI are assigned may be switched round between the first slot and the second slot.

By so doing, when only one of ACK/NACK and CQI is present, it is possible to obtain a time diversity effect with respect to ACK/NACK or CQI.

<Arrangement Rule 5>

Figure 10:
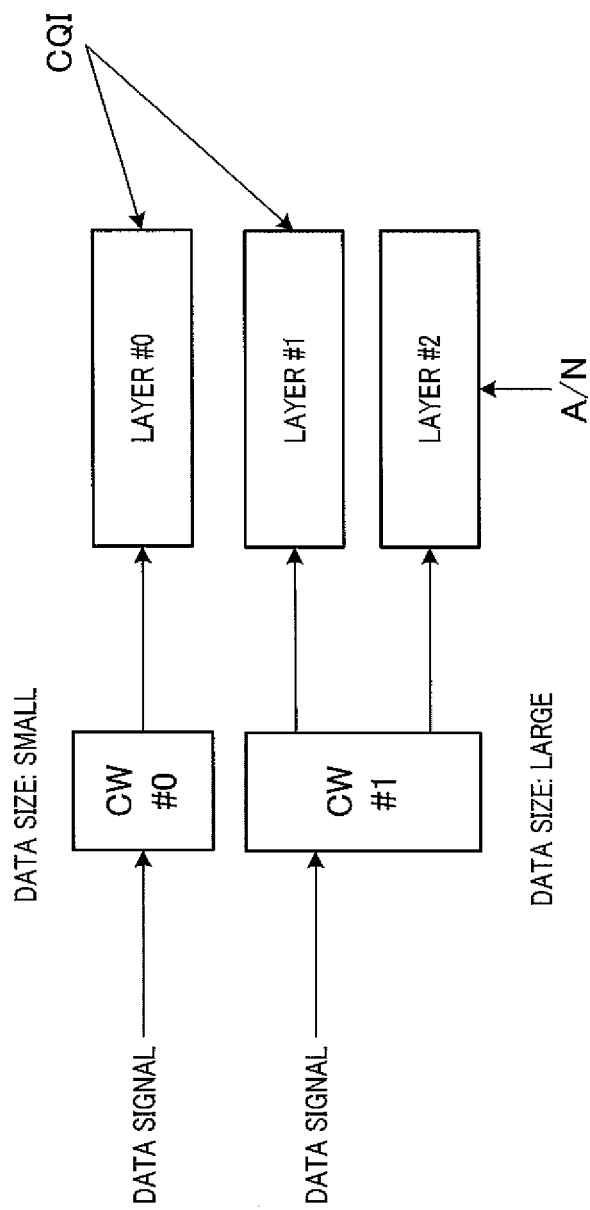
FIG. 10 is a diagram illustrating arrangement rule 5.

FIG. 10 is a diagram illustrating arrangement rule 5. Arrangement rule 5 defines layers from the standpoint of codewords and is applicable to aforementioned arrangement rules 1 to 4.

According to arrangement rule 5, ACK/NACK is preferentially arranged in a layer corresponding to a codeword having the largest data size. CQI is arranged in a layer in which no ACK/NACK is arranged.

In FIG. 10, layer #0 is associated with CW #0 of a small data size and layer #1 and layer #2 are associated with CW #1 of a large data size. ACK/NACK is assigned to layer #1 or layer #2 corresponding to CW #1 of a large data size and CQI is assigned to the other layers.

The reason that arrangement rule 5 is used is as follows. That is, ACK/NACK is assigned by puncturing data signals. Therefore, when this puncturing is performed, the probability that errors may occur in data signals increases. On the other hand, since rate matching is applied to CQI, when CQI is assigned, the probability that errors may occur in data signals is lower than in the case where ACK/NACK is assigned.

Furthermore, there is normally a difference in data size among a plurality of codewords and when the same number of punctured signals is assumed, the probability that errors may occur in data signals due to puncturing increases in codewords having a smaller data size.

As described above, it is preferable to assign CQI to a layer corresponding to a codeword having a small data size and assign ACK/NACK to a layer corresponding to a codeword having a large data size.

Furthermore, arrangement rule 5 is preferably applied to a terminal requiring the following condition. That is, arrangement rule 5 is suitable for a terminal for which a delay time is less acceptable and errors are preferred to be minimized in data signals having high QoS (Quality of Service).

In FIG. 10, CQI is assigned to a plurality of layers, but the present invention is not limited to this and CQI may also be assigned to only one layer.

By so doing, data signals are punctured in a codeword having a large data size, and influences of puncturing are thereby reduced, and it is thereby possible to reduce errors in data signals. Therefore, it is possible to reduce retransmission of data signals and thereby satisfy high QoS (Quality of Service) requirements of a terminal whose delay time is hardly acceptable.

<Arrangement Rule 6>

Figure 11:
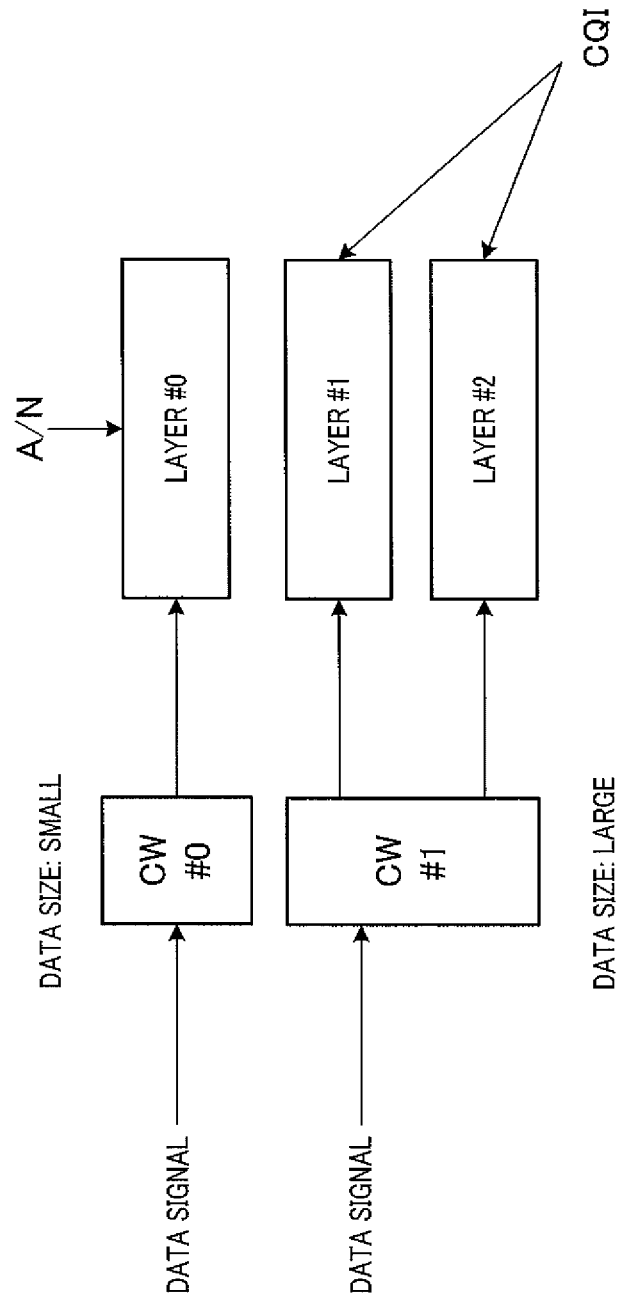
FIG. 11 is a diagram illustrating arrangement rule 6.

FIG. 11 is a diagram illustrating arrangement rule 6. Arrangement rule 6 defines a layer from the standpoint of codewords and is applicable to above-described arrangement rules 1 to 4.

According to arrangement rule 6, ACK/NACK is preferentially arranged in a layer corresponding to a codeword having the smallest data size. CQI is arranged in a layer in which ACK/NACK is not arranged.

In FIG. 11, layer #0 is associated with CW #0 of a small data size and layer #1 and layer #2 are associated with CW #1 of a large data size. ACK/NACK is assigned to layer #0 associated with CW #0 of a small data size and CQI is assigned to the other layers.

Arrangement rule 6 is used for the following reason. That is, ACK/NACK is assigned by puncturing data signals. Therefore, when this puncturing is performed, the probability that errors may occur in data signals increases. On the other hand, since rate matching is applied to CQI, the probability that errors may occur in data signals is lower in the case where CQI is assigned than in the case where ACK/NACK is assigned.

Furthermore, there is normally a difference in data size among a plurality of codewords. Since data signal errors are more likely to occur due to the puncturing, when the retransmission frequency of an arbitrary codeword increases, the smaller the data size of the arbitrary codeword, the smaller the amount of retransmission data becomes.

As described above, it is preferable to assign ACK/NACK to a layer corresponding to a codeword having a small data size and assign CQI to a layer corresponding to a codeword having a large data size.

Arrangement rule 6 is preferably applied to a terminal requiring the following condition. That is, when arrangement rule 6 is applied, a retransmission count increases compared to the case with arrangement rule 5, whereas the amount of retransmission data in each retransmission decreases. For this reason, arrangement rule 6 is suitable for a terminal for which the amount of retransmission data is preferred to be reduced.

When, for example, there are data signals having a small amount of data and having an acceptable retransmission delay, a codeword having a small data size is punctured using ACK/NACK so as to prevent retransmission of a codeword having a large data size. In this case, even when the probability that errors may occur in data signals due to the puncturing increases, retransmission is acceptable and it is therefore preferable to reduce the data size upon retransmission. Alternatively when there are data signals having a small amount of data and having strong error resistance, a codeword having a small data size is punctured using ACK/NACK so as to prevent retransmission of a codeword having a large data size. In this case, even when data signals are punctured, the probability that errors may occur in data signals is low, and it is therefore preferable to reduce the data size upon retransmission.

By so doing, data signals are punctured with a codeword having a small data size, and therefore data errors are more likely to occur in a codeword having a small data size. For this reason, the amount of data to be retransmitted can be reduced. Therefore, in an environment in which the probability that errors may occur in data signals can be minimized even when data signals are punctured (e.g., when both data sizes are relatively large), the total amount of retransmission data can be reduced.

According to arrangement rule 6, data signals may not be assigned to a codeword to which ACK/NACK is assigned. That is, only ACK/NACK is transmitted with a codeword to which ACK/NACK is assigned. For example, in FIG. 11, only ACK/NACK is transmitted in layer #0. This makes it possible to prevent retransmission with a codeword to which ACK/NACK is assigned. Furthermore, since ACK/NACK is assigned to a codeword having a small data size even in this case, throughput is unlikely to degrade even if no data signal is arranged in the codeword.

Furthermore, according to arrangement rule 6, MCS applicable to a codeword to which ACK/NACK is assigned may be set to be lower than usual. This makes the error resistance of data signals stronger, and can reduce the error rate. For example, in FIG. 11, MCS of a data signal is set to a low level in layer #0. This makes error resistance of data signals stronger, and can thereby suppress retransmission of the data signals.

Furthermore, arrangement rules 5 and 6 may be combined as follows. That is, a preferred application environment differs between arrangement rule 5 and arrangement rule 6. For this reason, arrangement rule 5 or arrangement rule 6 can be selected according to the environment. Higher layer signaling is used for this switching. In this way, it is possible to perform control according to an application environment and reduce extra retransmission of data signals.

<Arrangement Rule 7>

ACK/NACK is information more important than CQI. Thus, it is preferable to reduce the error rate of ACK/NACK and ACK/NACK may be arranged in a layer (or codeword) having higher MCS. This makes it possible to reduce the error rate of ACK/NACK. That is, when information of higher importance is arranged in a layer (or codeword), the information is arranged in a layer (or codeword) having higher MCS.

Base station 100 performs reception processing on ACK/NACK, CQI and uplink data according to a rule corresponding to the arrangement rule adopted in terminal 200.

As described above, according to the present embodiment, transmission signal forming section 212 in terminal 200 arranges ACK/NACK and CQI in a plurality of layers based on the arrangement rule and thereby forms a transmission signal. According to the arrangement rule, an error detection result is preferentially arranged in a layer different from a layer in which the channel quality information is arranged.

In this way, the puncturing of CQI using ACK/NACK can be minimized, with the result that the error characteristic of control information can be prevented from being degraded.

Embodiment 2

Embodiment 1 arranges an ACK/NACK signal in a layer different from a layer in which CQI is arranged and thereby prevents the error rate of CQI from being degraded. By contrast, Embodiment 2 maps one ACK/NACK signal to the same time and same frequency of a plurality of layers (that is, using transmission diversity). This makes it possible to increase the transmission rate of the ACK/NACK signal and reduce resources in which the ACK/NACK signal is arranged in each layer. As a result, it is possible to reduce the probability that CQI may be punctured by the ACK/NACK signal and thereby prevent the error rate of CQI from being degraded.

Since a base station and a terminal according to Embodiment 2 have basic configurations in common with Embodiment 1, the configurations will be described using FIGS. 4 and 5.

In the case of a MIMO transmission mode, transmission signal forming section 212 of terminal 200 according to Embodiment 2 forms a transmission signal by arranging an ACK/NACK signal (that is, error detection result of downlink data) and downlink quality information (CQI) in a plurality of layers based on a "arrangement rule."

<Arrangement Rule 8>

Figure 12:
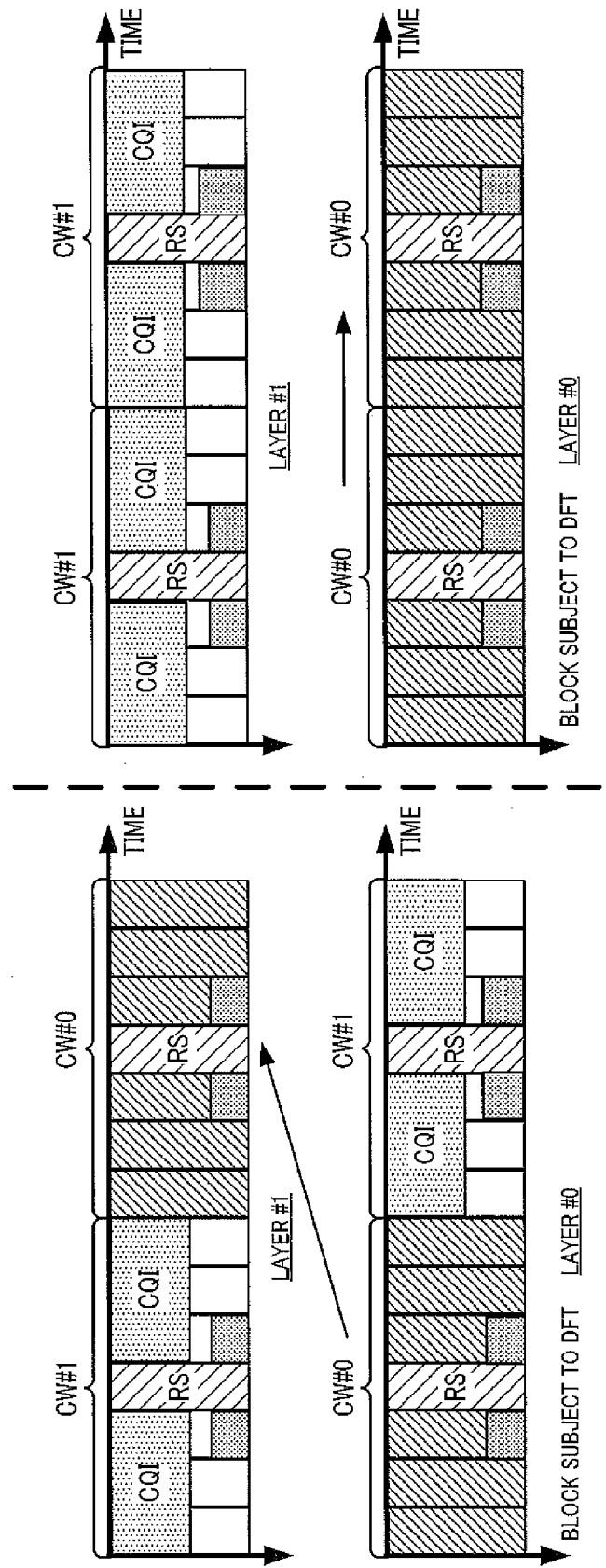
FIG. 12 is a diagram illustrating arrangement rule 8 according to Embodiment 2 of the present invention.

FIG. 12 is a diagram illustrating arrangement rule 8. According to arrangement rule 8, one ACK/NACK signal is mapped to the same time and frequency of a plurality of layers. Furthermore, according to arrangement rule 8, CQI is mapped to some of the plurality of layers.

As shown in FIG. 12, when, for example, the same ACK/NACK signal is arranged in the same time and frequency of layer #0 and layer #1, no interference between ACK/NACK signals occurs. Furthermore, the receiving side of the ACK/NACK signal receives in combination ACK/NACK signals transmitted in layer #0 and layer #1. Therefore, in this case, it is possible to secure equal received quality of ACK/NACK signals even when transmitting ACK/NACK signals at a high transmission rate compared to a case where there is interference between signals.

However, since the same ACK/NACK is arranged in a plurality of layers in this case, transmission resources of the ACK/NACK signals in all layers as a whole may increase. However, it is possible to reduce transmission resources of ACK/NACK signals in each layer and thereby reduce the probability that CQI may be punctured by the ACK/NACK signals.

This makes it possible to reduce degradation of the error rate of CQI.

Furthermore, since a diversity effect is obtained by arranging the same ACK/NACK signal at the same time and the same frequency in a plurality of layers, ACK/NACK transmission can be realized with higher reliability.

Furthermore, an ACK/NACK signal requires high quality (e.g., error rate 0.1%), whereas CQI only requires relatively low quality (e.g., error rate 1%). Therefore, as shown in FIG. 12, ACK/NACK signals are transmitted from two layers, whereas CQI is transmitted in one layer, with the result of satisfying required qualities of both the ACK/NACK signals and CQI.

As in the case of arrangement rule 9 which will be described later, CQI as well as ACK/NACK signals can also be arranged in a plurality of layers. However, since CQI has more bits than the ACK/NACK signal, resources used for CQI transmission may drastically increase. Thus, CQI is preferably arranged in one layer (or codeword).

At this time, CQI is preferably arranged in a layer of high received quality (that is, high MCS). This is because if CQI is arranged in a layer of high received quality (that is, high MCS), resources for mapping CQI can be reduced and it is possible to reduce the possibility that CQI may be punctured by an ACK/NACK signal. CQI may also be arranged in one or more layers belonging to CW of high received quality (that is, high MCS).

Furthermore, at this time, CQI may also be arranged in CW (codeword) of a large data size. This can reduce the possibility of CQI of reaching a region where an ACK/NACK signal is located. CQI may also be arranged in one or more layers belonging to CW of greater data size.

<Arrangement Rule 9>

According to arrangement rule 8, the same ACK/NACK signal is mapped to a plurality of the same times and same frequencies of a plurality of layers to prepare a condition for allowing an ACK/NACK signal to be transmitted at a high transmission rate. However, it is also possible to transmit an ACK/NACK signal at a high transmission rate according to arrangement rule 9. That is, according to arrangement rule 9, an ACK/NACK signal is transmitted in one layer, and neither data nor ACK/NACK signal is transmitted in other layers. This reduces interference between signals with ACK/NACK signals, and can thereby transmit the ACK/NACK signals at a high transmission rate. That is, according to arrangement rule 9, ACK/NACK signals match time/frequency resources to be mapped in an arbitrary layer, whereas no transmission signal is mapped to time/frequency resources in any layer other than the arbitrary layer.

<Arrangement Rule 10>

Figure 13:
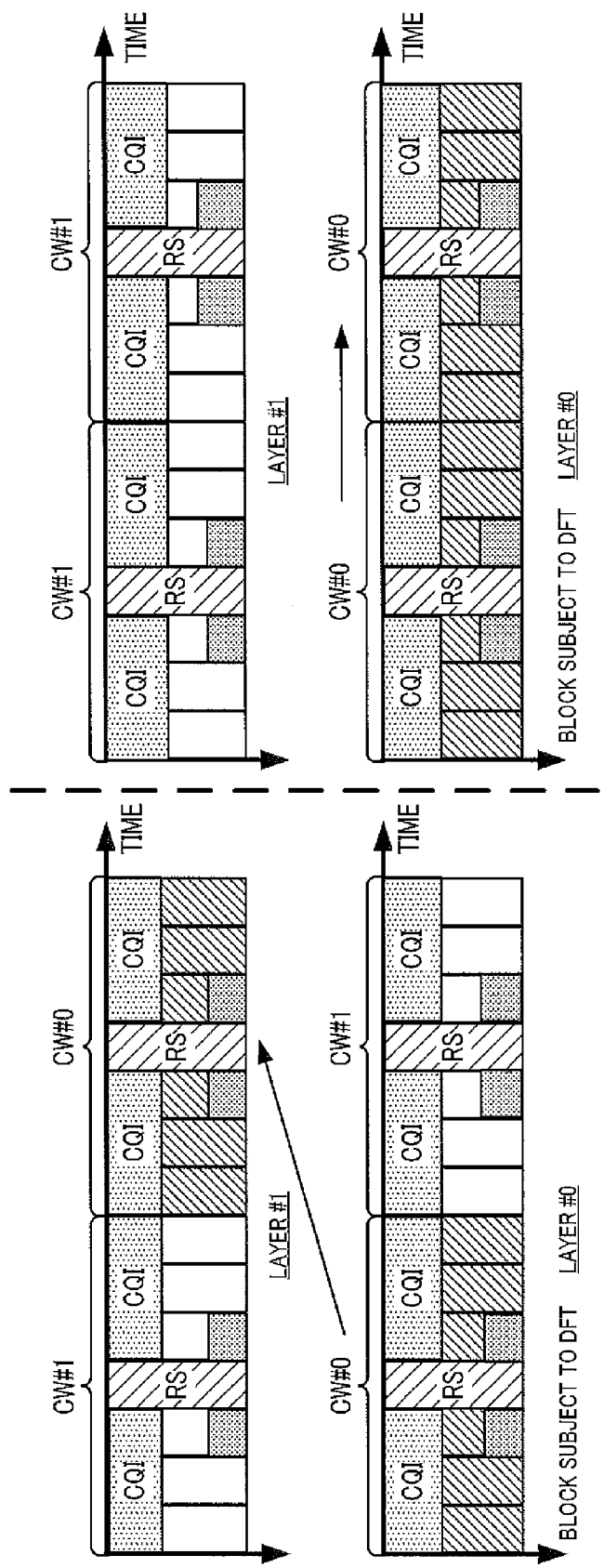
FIG. 13 is a diagram illustrating arrangement rule 10 according to Embodiment 2 of the present invention.

According to arrangement rule 8, ACK/NACK signals are arranged in a plurality of layers (or codewords), whereas CQI is arranged in one layer (or codeword). By contrast, arrangement rule 10 is similar to arrangement rule 8 regarding ACK/NACK signals, whereas CQI is arranged in a plurality of layers (see FIG. 13). That is, regarding CQI, different CQIs are arranged in a plurality of layers to thereby perform spatial multiplexing. By so doing, it is possible to reduce, in each layer, both resources in which ACK/NACK signals are arranged and resources in which CQI is arranged, and thereby reduce the possibility that CQI may be punctured by ACK/NACK. Furthermore, required qualities of both ACK/NACK signals and CQI are also satisfied.

Other Embodiments (1) The above embodiments have described arrangement control of ACK/NACK and CQI for every slot, but the present invention is not limited to this, and arrangement control may also be performed for every symbol. Furthermore, it may be possible to use only one of the presence of layer shifting and the absence of layer shifting.

(2) The MIMO transmission mode in the above embodiments may be transmission modes 3 and 4 defined in LTE, that is, a transmission mode in which transmission of two CWs is supported, and the non-MIMO transmission mode may be any other transmission mode, that is, a transmission mode in which only one CW is transmitted.

Furthermore, the codeword in the above embodiments may be rearranged by a transport block (TB).

(3) The above embodiments have described ACK/NACK and CQI as control information, but the present invention is not limited to this, and the present invention is applicable to any information (control information) requiring higher received quality than that of data signals. For example, CQI or ACK/NACK may be rearranged by PMI (precoding-related information) or RI (rank-related information).

(4) The "layer" in the above embodiments refers to a virtual channel in the space. For example, in MIMO transmission, a data signal generated in each CW is transmitted through different virtual channels (different layers) in the space at same time and same frequency. The "layer" may also be called "stream."

(5) The above embodiments have described the case where the present invention is applied to an antenna, but the present invention is likewise applicable to an antenna port.

The antenna port refers to a theoretical antenna including a single or a plurality of physical antenna(s). That is, the antenna port is not limited to a single physical antenna, but may refer to an array antenna made up of a plurality of antennas.

For example, 3 GPP LTE does not define the number of physical antennas that constitute an antenna port, but 3 GPP LTE defines the antenna port as a minimum unit that allows the base station to transmit different reference signals.

In addition, the antenna port may also be defined as a minimum unit for multiplying a precoding vector by a weight.

(6) The above embodiments have been described on the assumption of asymmetric carrier aggregation. However, in the case where control information such as ACK/NACK or CQI is multiplexed with data in MIMO transmission using a plurality of layers, the present invention is not limited to asymmetric carrier aggregation. Furthermore, N is assumed to be a natural number equal to or greater than 2, but arrangement rules from arrangement rule 2 onward are not limited to this, and N may also be 1.

(7) Regarding arrangement rule 1, Embodiment 1 has shown an example where an ACK/NACK signal is arranged in a layer different from a layer in which CQI is arranged, but CQI may also be arranged in a layer different from a layer in which an ACK/NACK signal is arranged.

(8) The above embodiments have described an example where an ACK/NACK signal or CQI is arranged in a layer, but the present invention is not limited to this, and an ACK/NACK signal or CQI may also be arranged in a codeword. For example, in the case where data is transmitted in a total of four layers, codeword 1 is transmitted using layers 1 and 2, codeword 2 is transmitted using layers 3 and 4, Embodiment 1 may be adapted so that an ACK/NACK signal is arranged in codeword 1 (that is, layers 1 and 2) and CQI is arranged in codeword 2 (that is, layers 3 and 4). Furthermore, Embodiment 2 may also be adapted so that an ACK/NACK signal is arranged in codewords 1 and 2 (that is, layers 1 to 4) and CQI is arranged in codeword 2 (that is, layers 3 and 4).

(9) In Embodiment 2, according to arrangement examples 8 and 10, the same ACK/NACK signal is arranged in the same time and frequency in a plurality of layers. Furthermore, the ACK/NACK signal may be subjected to scrambling which differs from one layer to another. This makes it possible to prevent an unintended beam from being formed because of a phase relationship in each layer.

The component carrier may be defined by a physical cell number and a carrier frequency number or may be called "cell."

(10) Also, although cases have been described with the above embodiment as examples where the present invention is configured by hardware, the present invention can also be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to rearrange LSI's as a result of the advancement of semiconductor technology or a derivative other technology, it is naturally also possible to carry out function block integration using this technology. Application of biotechnology is also possible.

The disclosure of Japanese Patent Application No. 2010-027959, filed on Feb. 10, 2010 and Japanese Patent Application No. 2010-105326, filed on Apr. 30, 2010, including the specification, drawings and abstract is incorporated herein by reference in its entirety.

INDUSTRIAL APPLICABILITY

The terminal and the communication method thereof of the present invention is useful in preventing the error characteristic of control information from being degraded even when employing an asymmetric carrier aggregation scheme and further employing a MIMO transmission method on an uplink.

REFERENCE SIGNS LIST 100 base station
101 setting section
102 control section
104 PDCCH generation section
105, 107, 108 coding/modulation section
106 assignment section
109 multiplexing section
110, 215 IFFT section
111, 216 CP adding section
112, 217 RF transmission section
113, 201 antenna
114, 202 RF reception section
115, 203 CP removing section
116, 204 FFT section
117 extraction section
118 IDFT section
119 data reception section
120 control information reception section
200 terminal
205 demultiplexing section
206 setting information reception section
207 PDCCH reception section
208 PDSCH reception section
209, 210, 211 modulation section
212 transmission signal forming section
213 DFT section
214 mapping section
221 data/CQI assignment section
222 puncturing section

The invention claimed is:

1. A base station apparatus comprising:
a transmitter which, in operation, transmits downlink data to a terminal apparatus;
a receiver which, in operation, receives a plurality of transport blocks which are transmitted in a same time period using a same frequency band in a spatial multiplexing scheme, wherein a same acknowledgement information (ACK) relating to an error detection result of the downlink data is scrambled with different scrambling schemes respectively for the plurality of transport blocks and the respectively scrambled acknowledgement information is arranged on respective ones of the plurality of transport blocks, and channel quality information (CQI) of a downlink channel is arranged on only one transport block of the plurality of transport blocks by the terminal apparatus; and
a control information receiver which, in operation, extracts the acknowledgement information arranged on respective ones of the plurality of transport blocks and the channel quality information arranged on the only one transport block of the plurality of transport blocks.

2. The base station apparatus according to claim 1, wherein
the transmitter, in operation, transmits the downlink data using N (N is a natural number equal to or greater than 2) downlink component carriers in the downlink channel; and
the receiver, in operation, receives the plurality of transport blocks which are transmitted in a same time period using a same frequency band on an uplink component carrier, wherein acknowledgement information corresponding to the N downlink component carriers is arranged on the plurality of transport blocks included in the uplink component carrier, and the channel quality information is arranged on the only one transport block of the plurality of transport blocks included in the uplink component carrier.

3. The base station apparatus according to claim 1, wherein
the only one transport block on which the channel quality information is arranged is a transport block with the highest modulation and coding rate scheme (MCS) among the plurality of transport blocks.

4. The base station apparatus according to claim 1, wherein
the acknowledgement information is arranged such that a specified acknowledgement information is replicated and mapped on each of the plurality of the transport blocks.

5. The base station apparatus according to claim 1, wherein
a precoding-related information (PMI) is further arranged, in addition to the channel quality information, on the only one transport block of the plurality of transport blocks.

6. A communication method for a base station apparatus, the communication method comprising:
transmitting downlink data to a terminal apparatus;
receiving a plurality of transport blocks which are transmitted in a same time period using a same frequency band in a spatial multiplexing scheme, wherein a same acknowledgement information (ACK) relating to an error detection result of the downlink data is scrambled with different scrambling schemes respectively for the plurality of transport blocks and the respectively scrambled acknowledgement information is arranged on respective ones of the plurality of transport blocks, and channel quality information (CQI) of a downlink channel is arranged on only one transport block of the plurality of transport blocks by the terminal apparatus; and extracting the acknowledgement information arranged on respective ones of the plurality of transport blocks and the channel quality information arranged on the only one transport block of the plurality of transport blocks.

7. The communication method according to claim 6, wherein the transmitting includes transmitting the downlink data using N (N is a natural number equal to or greater than 2) downlink component carriers in the downlink channel; and the receiving includes receiving the plurality of transport blocks which are transmitted in a same time period using a same frequency band on an uplink component carrier, wherein acknowledgement information corresponding to the N downlink component carriers is arranged on the plurality of transport blocks included in the uplink component carrier, and the channel quality information is arranged on the only one transport block of the plurality of transport blocks included in the uplink component carrier.

8. The communication method according to claim 6, wherein the only one transport block on which the channel quality information is arranged is a transport block with the highest modulation and coding rate scheme (MCS) among the plurality of transport blocks.

9. The communication method according to claim 6, wherein the acknowledgement information is arranged such that a specified acknowledgement information is replicated and mapped on each of the plurality of the transport blocks.

10. The communication method according to claim 6, wherein a precoding-related information (PMI) is further arranged, in addition to the channel quality information, on the only one transport block of the plurality of transport blocks.

* * * * *